US010681327B2

(12) United States Patent
Weng et al.

(10) Patent No.: US 10,681,327 B2
(45) Date of Patent: Jun. 9, 2020

(54) SYSTEMS AND METHODS FOR REDUCING HORIZONTAL MISALIGNMENT IN 360-DEGREE VIDEO (71) Applicant: CyberLink Corp., Shindian, Taipei (TW)

(72) Inventors: Shan-Jan Weng, Taipei (TW); Dwen-Wei Shen, Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 22 days.

(21) Appl. No.: 15/708,524

(22) Filed: Sep. 19, 2017

(65) Prior Publication Data

US 2018/0084236 A1 Mar. 22, 2018

Related U.S. Application Data (60) Provisional application No. 62/396,896, filed on Sep. 20, 2016.

(51) Int. Cl.
*H04N 13/117* (2018.01)
*H04N 5/232* (2006.01)
(Continued)

(52) U.S. Cl.
CPC ......... *H04N 13/117* (2018.05); *G06T 3/4038* (2013.01); *H04N 5/23238* (2013.01);
(Continued)

(58) Field of Classification Search
CPC ..... G06F 3/048; G06T 3/4038; H04N 13/117; H04N 13/122; H04N 13/189;
(Continued)

(56) References Cited

U.S. PATENT DOCUMENTS 7,518,793 B2 4/2009 Mashitani et al.
8,848,033 B2 9/2014 Li et al.
(Continued)

FOREIGN PATENT DOCUMENTS

EP 2518686 A1 10/2012
EP 2545411 A1 1/2013

OTHER PUBLICATIONS

Viewpoint correction, PTGui Pro, https://www.ptgui.com/examples/vptutorial.html (Printed on Sep. 15, 2017).
(Continued)

*Primary Examiner* — Farzana Hossain
(74) *Attorney, Agent, or Firm* — McClure, Qualey & Rodack, LLP (57) ABSTRACT A computing device for reducing horizontal misalignment in a 360-degree video converts the 360-degree video to a rectilinear 360-degree video. At least a pair of views of rectilinear images from the rectilinear 360-degree video are generated and displayed. A user interface for facilitating adjustment of a view angle is generated, the user interface displaying the at least the pair of views of the rectilinear images from the rectilinear 360-degree video. The computing device obtains vertical reference object is obtained in one of the views of rectilinear images; at least one of: a roll angle adjustment, a pitch angle adjustment, and a yaw angle adjustment for aligning the vertical reference object with a vertical axis; and a view angle adjustment corresponding to reduction of the horizontal misalignment. A panoramic 360-degree video is then generated.

9 Claims, 10 Drawing Sheets (51) Int. Cl.
  *H04N 5/445* (2011.01)
  *H04N 13/189* (2018.01)
  *H04N 13/282* (2018.01)
  *H04N 13/246* (2018.01)
  *G06T 3/40* (2006.01)
  *H04N 13/122* (2018.01)
  *G06F 3/048* (2013.01)

(52) U.S. Cl.
  CPC ....... *H04N 5/44504* (2013.01); *H04N 13/122* (2018.05); *H04N 13/189* (2018.05); *H04N 13/246* (2018.05); *H04N 13/282* (2018.05); *G06F 3/048* (2013.01)

(58) Field of Classification Search
  CPC ............... H04N 13/246; H04N 13/282; H04N 5/23238; H04N 5/44504
  See application file for complete search history.

(56) References Cited

U.S. PATENT DOCUMENTS

| | | | |
|---|---|---|---|
| 9,277,122 | B1 | 3/2016 | Imura et al. |
| 9,888,179 | B1* | 2/2018 | Liang ................. H04N 5/23258 |
| 2007/0025723 | A1 | 2/2007 | Baudisch et al. |
| 2014/0087877 | A1 | 3/2014 | Krishnan |
| 2016/0353089 | A1* | 12/2016 | Gallup ............... G02B 27/0172 |
| 2017/0339341 | A1* | 11/2017 | Zhou .................. H04N 5/23238 |

OTHER PUBLICATIONS

Houghton, John. "How to use Panorama Tools & PTGui to produce a printable panorama" http://www.johnhpanos.com/pttute.htm. Mar. 20, 2006.

* cited by examiner

SYSTEMS AND METHODS FOR REDUCING HORIZONTAL MISALIGNMENT IN 360-DEGREE VIDEO

CROSS-REFERENCE TO RELATED APPLICATION

This application claims priority to, and the benefit of, U.S. Provisional Patent Applications entitled, "Systems and Methods for Correcting Horizontal Misalignment in 360-degree video," having Ser. No. 62/396,896, filed on Sep. 20, 2016, which is incorporated by reference in its entirety.

TECHNICAL FIELD

The present disclosure generally relates to video processing and more particularly, to systems and methods correcting horizontal misalignment in 360-degree video.

BACKGROUND

As smartphones and other mobile devices have become ubiquitous, people have the ability to capture video virtually anytime. Furthermore, 360-degree videos have gained increasing popularity.

SUMMARY

Systems and methods for reducing horizontal misalignment in 360-degree video are disclosed. In a first embodiment, a computing device for reducing horizontal misalignment in a 360-degree video converts the 360-degree video to a rectilinear 360-degree video. At least a pair of views of rectilinear images from the rectilinear 360-degree video are generated and displayed. A user interface for facilitating adjustment of a view angle is generated, the user interface displaying the at least the pair of views of the rectilinear images from the rectilinear 360-degree video. The computing device obtains vertical reference object is obtained in one of the views of rectilinear images; at least one of: a roll angle adjustment, a pitch angle adjustment, and a yaw angle adjustment for aligning the vertical reference object with a vertical axis; and a view angle adjustment corresponding to reduction of the horizontal misalignment. A panoramic 360-degree video is then generated.

Another embodiment is a system that comprises a memory device storing instructions and a processor coupled to the memory device. The processor is configured by the instructions to convert the 360-degree video to a rectilinear 360-degree video. The processor is further configured to generate and display at least a pair of views of rectilinear images from the rectilinear 360-degree video. The processor is further configured to generate a user interface for facilitating adjustment of a view angle, the user interface displaying the at least the pair of views of the rectilinear images from the rectilinear 360-degree video. The processor is further configured to obtain a vertical reference object in one of the views of rectilinear images and obtain at least one of: a roll angle adjustment, a pitch angle adjustment, and a yaw angle adjustment for aligning the vertical reference object with a vertical axis. The processor is further configured to obtain view angle adjustment corresponding to reduction of the horizontal misalignment. The processor is further configured to generate a panoramic 360-degree video based on each of: the obtained vertical reference object; the at least one of: the roll angle adjustment, the pitch angle adjustment; and the yaw angle adjustment, and the view angle adjustment.

Another embodiment is a non-transitory computer-readable storage medium storing instructions to be implemented by a computing device having a processor. The instructions, when executed by the processor, cause the computing device to convert the 360-degree video to a rectilinear 360-degree video. The processor is further configured by the instructions to generate and display at least a pair of views of rectilinear images from the rectilinear 360-degree video. The processor is further configured by the instructions to generate a user interface for facilitating adjustment of a view angle, the user interface displaying the at least the pair of views of the rectilinear images from the rectilinear 360-degree video. The processor is further configured by the instructions to obtain a vertical reference object in one of the views of rectilinear images and obtain at least one of: a roll angle adjustment, a pitch angle adjustment, and a yaw angle adjustment for aligning the vertical reference object with a vertical axis. The processor is further configured by the instructions to obtain view angle adjustment corresponding to reduction of the horizontal misalignment. The processor is further configured by the instructions to generate a panoramic 360-degree video based on each of: the obtained vertical reference object; the at least one of: the roll angle adjustment, the pitch angle adjustment; and the yaw angle adjustment, and the view angle adjustment.

BRIEF DESCRIPTION OF THE DRAWINGS

Various aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

An increasing number of digital capture devices are equipped with the ability to record 360 degree content including image and video (hereinafter "360-degree video"), which offers viewers a fully immersive experience. The creation of 360-degree video generally involves capturing a full 360 degree view using multiple cameras, stitching the captured views together, and encoding the video. However, even very small movement by one or more of the cameras during the recording process can result in a visible parallax effect. In some cases, misalignment of the captured content in the horizontal direction may occur as illustrated, for example, by the dashed line in FIG. 4.

Various embodiments are disclosed for systems and methods for reducing horizontal misalignment in 360-degree video. Since editing of 360-degree video is still gaining popularity among casual users, the availability of editing tools that adjust or correct misaligned horizontal views is still somewhat limited. A conventional way for adjusting the view angle is performed while in panorama view. However, it is generally more difficult for users to identify a horizontal or vertical reference in panorama view. An improved technique for correcting misaligned horizontal views is disclosed horizontal or vertical reference objects are more easily identified.

In accordance with various embodiments, the prevent invention provides a pair view of rectilinear views for facilitating adjustment of the viewing angle. The pair view of rectilinear views comprises two opposing views (e.g., back view and front view). For some embodiments, multiple pairs of rectilinear views may be utilized. In some embodiments, a horizontal reference line is superimposed on each set of opposing views (front-back views and right-left views). For some embodiments, one or more vertical reference features are first within the different views. An adjusting module allows the user to move the view angle in the rectilinear view, and the adjusting module collects data while the user is adjusts the view angle.

The vertical reference feature corresponds to a vertical attribute, structure, or component corresponding to one or more objects depicted in the 360-degree video, where the angle of the vertical reference feature provides an indication of the camera angle. An example of a vertical reference feature is one of the walls of a building. Another example is a window. Based on whether the wall or window is tilted in the 360-degree video, the user determines whether adjustments to the roll angle, pitch angle, and/or yaw angle are needed to align the vertical reference feature with the vertical axis (y-axis). Such adjustments are made to ensure that the wall or window is not titled at an angle. Thus, based on whether vertical reference features are aligned with the vertical axis, adjustments to the roll angle, pitch angle, and/or yaw angle are performed as needed to ensure alignment with the vertical axis. Once the vertical reference features are properly aligned, any misalignment among the different views in the horizontal direction is then rectified. The user identifies the vertical and horizontal reference objects. The adjusting module provides a tool to show a horizontal or vertical reference line while in the rectilinear view so that the user can easily match the object to the reference line.

In some embodiments, the content in a 360-degree video is adjusted in opposite rectilinear views (front-back views and right-left views), where the field of view of the camera is adjusted by first adjusting the roll angle, pitch angle, and/or yaw angle of the camera in one of the opposing views. For example, adjusting the roll angle, pitch, and/or yaw angle of the front view facilitates correction of any horizontal misalignment spanning between the front and back view combination. The adjusted 360-degree video is then applied to generate 360-degree panoramic content or preview in rectilinear mode. For some embodiments, the system may render a grid or other guide onto the 360-degree video during adjustment of the roll angle, pitch, and/or yaw angle. This allows the user to fine tune the adjustment performed by the system.

Figure 1:
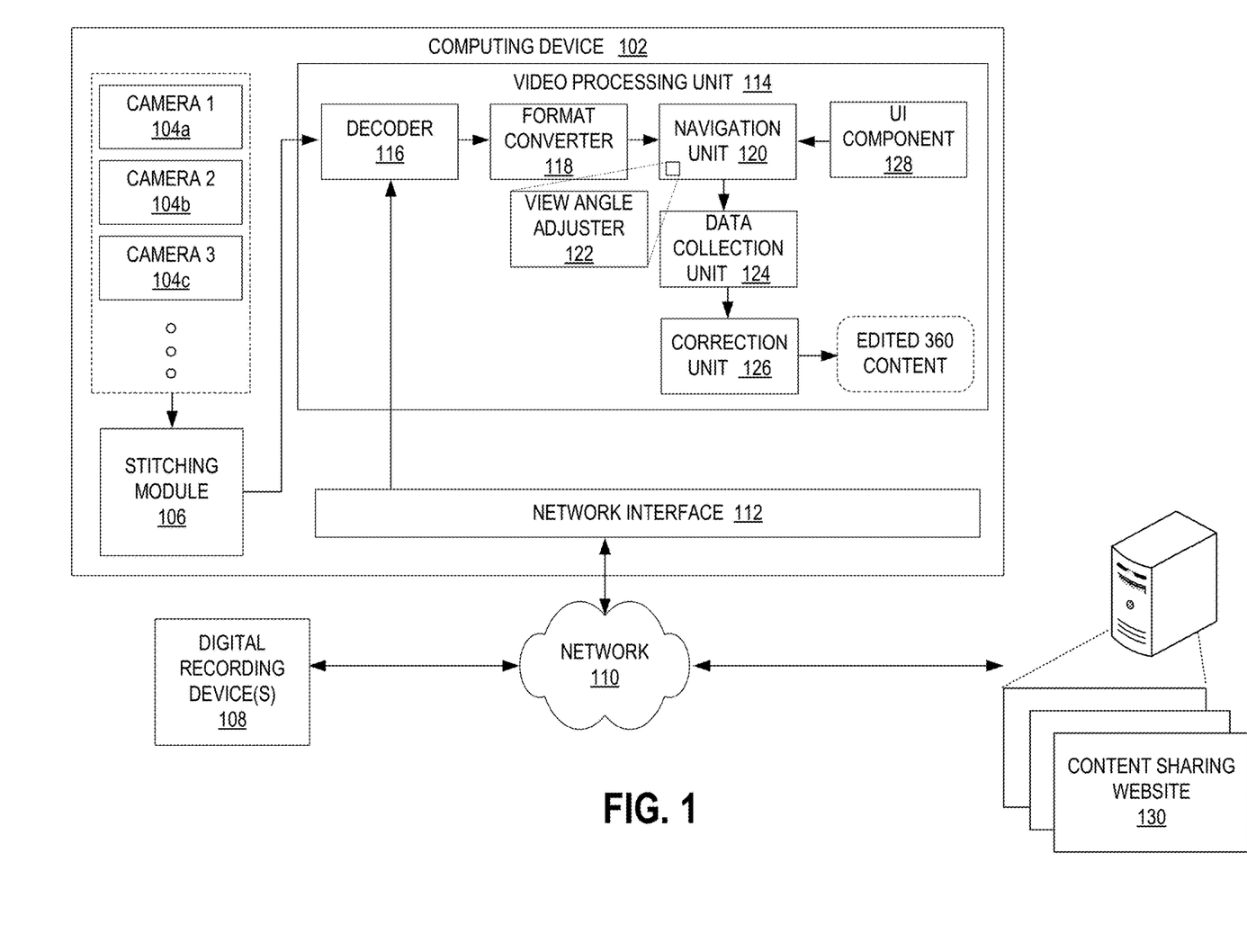
FIG. 1 is a block diagram of a computing device in which the disclosed horizontal misalignment correction techniques may be implemented in accordance with various embodiments.

A description of a system for implementing the disclosed correction algorithms is now described followed by a discussion of the operation of the components within the system. FIG. 1 is a block diagram of a computing device 102 in which the various correction algorithms disclosed herein may be implemented. The computing device 102 may be embodied as a computing device 102 equipped with digital content recording capabilities, where the computing device 102 may include, but is not limited to, a digital camera, a smartphone, a tablet computing device, a digital video recorder, a laptop computer coupled to a webcam, and so on.

For some embodiments, the computing device 102 may be equipped with a plurality of cameras 104a, 104b, 104c where the cameras 104a, 104b, 104c are utilized to capture digital media content comprising 360 degree views. In accordance with such embodiments, the computing device 102 may further comprise a stitching module 106 configured to process the 360 degree views. Alternatively, the computing device 102 may obtain 360-degree video from other digital recording devices 108 coupled to the computing device 102 over a network 110 through a network interface 112. The computing device may also obtain 360-degree video from one or more media content sharing websites 130 hosted on a server via the network 110.

A video processing unit 114 implemented in the computing device 102 is configured to perform various operations for reducing horizontal misalignment in 360-degree videos. The video processing unit 114 may be embodied in hardware, software, or a combination of both. When embodied in software, computer-readable instructions relating to functionality of the video processing unit 114 are executed by a processor device of the computing device 102. The instructions, when executed, cause the processor device to execute the various algorithms described below.

A decoder 116 in the video processing unit 114 receives 360-degree video from either the stitching module 106 or from an external source. A format converter 118 analyzes the camera lens type (e.g., fisheye) used in capturing content of the 360-degree video and converts the 360-degree video into a rectilinear format if the lens type associated with the 360-degree video is not already in rectilinear format. For example, the format converter may convert a 360-degree video originally in panorama format to rectilinear format.

Conversion of the 360-degree video to rectilinear format facilitates the horizontal misaligned correction process as images/frames in the 360-degree video in rectilinear format generally contain objects (e.g., buildings, roads) with straight features. The navigation unit 120 includes a vertical reference locator configured to search for objects within the current 360-degree video frame that contains a straight vertical edge/line that is normally aligned with a vertical axis (i.e., where the edge/line extends up and down). For example, the vertical reference locator may be configured to search for buildings, signs, etc. within the current frame of the 360-degree video.

The navigation unit 120 further comprises an angle adjuster 122 for modifying the field of view by adjusting the roll angle, pitch angle, and/or yaw angle. A user interface (UI) component 128 generates a user interface to facilitate adjustment of a view angle, where the user interface displays one or more pairs of views of the rectilinear images from the rectilinear 360-degree video. The user interface generated by the UI component 128 also allows the user to specify a vertical reference object in one of the views of rectilinear images.

The user interface is also generated to allow the user to specify a roll angle adjustment, a pitch angle adjustment, and/or a yaw angle adjustment for aligning the vertical reference object with a vertical axis. This allows the user to perform view angle adjustment corresponding to reduction of any horizontal misalignment. If the user is unable to locate a suitable object candidate to designate as a vertical reference within the current field of view, the user adjusts the roll angle, pitch angle, and/or yaw angle until a suitable object candidate is located within the field of view.

Figure 6:
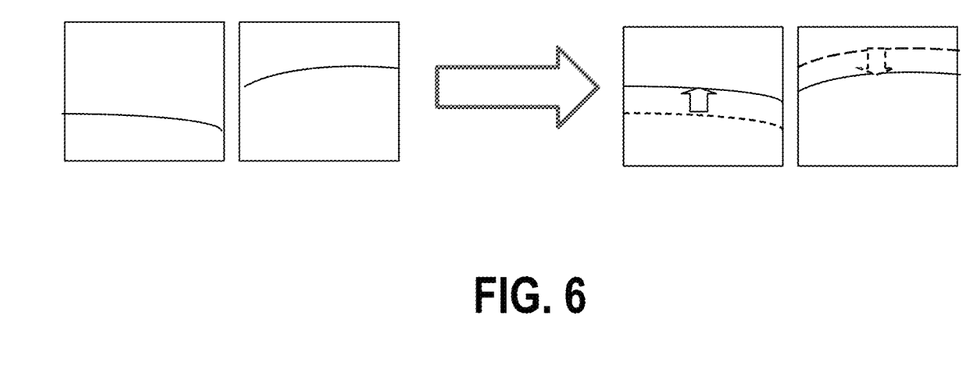
FIG. 6 illustrates correction of horizontal misalignment in accordance with various embodiments.

The correction unit 126 utilizes the navigation unit 120 to adjust the roll angle, pitch angle and/or yaw angle to ensure that the horizontal reference line across different views is aligned, as shown in FIG. 6. The data collection unit 124 collects data during: identification of a vertical reference object by the user, adjustment by the user of a roll angle, pitch angle, and/or yaw angle until the vertical reference object is aligned with a vertical axis; and correction of the horizontal misalignment. The correction unit 126 then generates panoramic content based on the collected data.

As one of ordinary skill will appreciate, the digital media content may be encoded in any of a number of formats including, but not limited to, Motion Picture Experts GroupMPEG-2, MPEG-4, H.264, Third Generation Partnership Project (3GPP), 3GPP-2, Standard-Definition Video (SD-Video), High-Definition Video (HD-Video), Digital Versatile Disc multimedia, Digital Television Video/High-definition Digital Television (DTV/HDTV) multimedia, Audio Video Interleave (AVI), Digital Video (DV), Quick-Time (QT) file, Windows Media Video (WMV), Advanced System Format (ASF), Real Media (RM), Flash Media (FLV), or any number of other digital formats.

Figure 2:
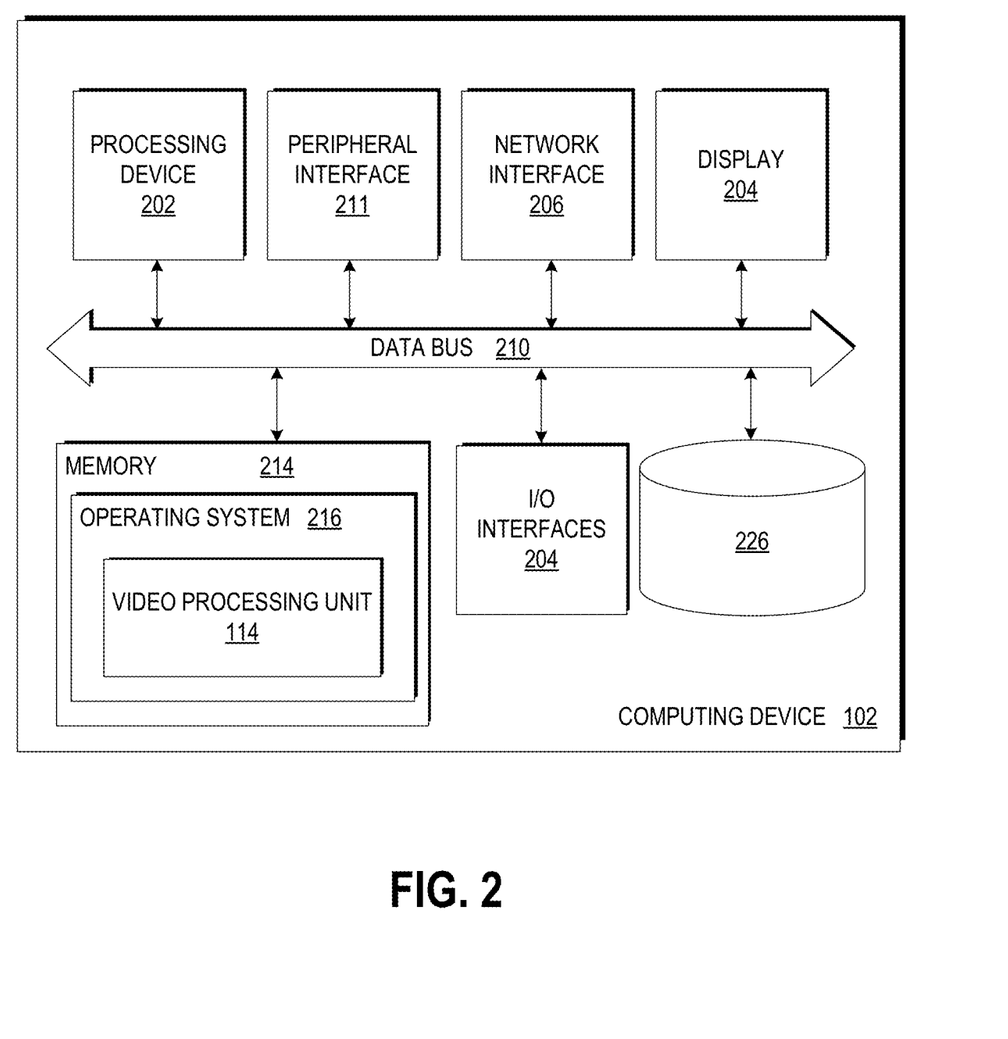
FIG. 2 illustrates a schematic block diagram of the computing device in FIG. 1 in accordance with various embodiments.

FIG. 2 illustrates a schematic block diagram of the computing device 102 in FIG. 1. The computing device 102 may be embodied in any one of a wide variety of wired and/or wireless computing devices, such as a desktop computer, portable computer, dedicated server computer, multi-processor computing device, smart phone, tablet, and so forth. As shown in FIG. 2, each of the computing device 102 comprises memory 214, a processing device 202, a number of input/output interfaces 204, a network interface 206, a display 104, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the computing device 102 comprises a personal computer, these components may interface with one or more user input/output interfaces 204, which may comprise a keyboard or a mouse, as shown in FIG. 2. The display 104 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
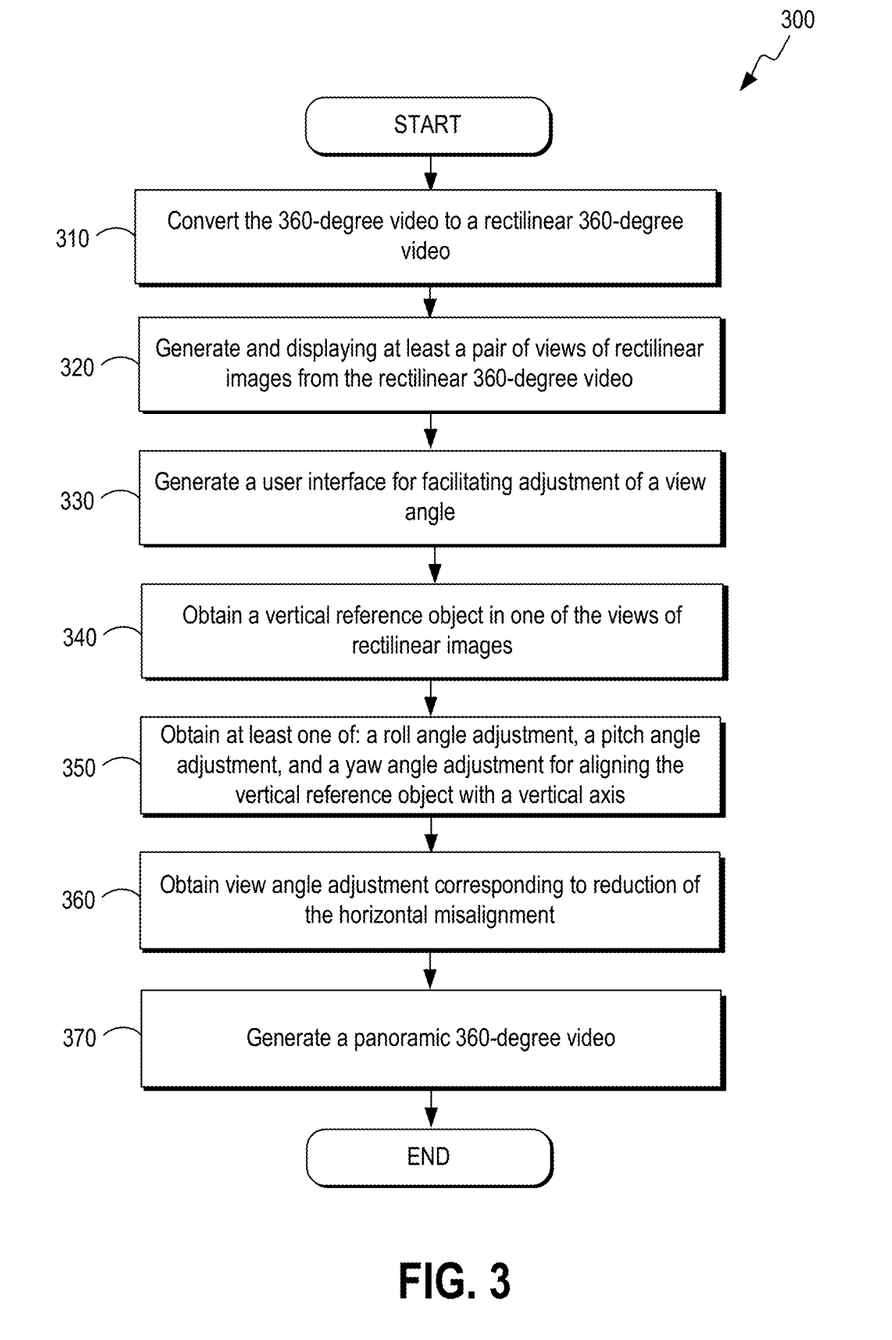
FIG. 3 is a flowchart for correcting horizontal misalignment in a 360-degree video utilizing the computing device of FIG. 1 in accordance with various embodiments.

Reference is made to FIG. 3, which is a flowchart 300 of operations executed by the computing device 102 in FIG. 1 for reducing horizontal misalignment in a 360-degree vide. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

To begin, in block 310, a 360-degree video received by the computing device 102 is converted to a rectilinear 360-degree video. In block 320, one or more pairs of views of rectilinear images from the rectilinear 360-degree video are generated and displayed to a user.

In block 330, a user interface for facilitating adjustment of a view angle is generated. In accordance with some embodiments, the user interface displays the pair(s) of views of the rectilinear images from the rectilinear 360-degree video. In accordance with some embodiments, the pair(s) of views comprise opposing views, which are displayed in the user interface to the user. The opposing views may be displayed, for example, in a side-by-side configuration where both views are displayed concurrently. The opposing views may comprise a rectilinear image corresponding to a front view and a rectilinear image corresponding to a back view. Alternatively, the opposing views may comprise a rectilinear image corresponding to a left view and a rectilinear image corresponding to a right view. Furthermore, as the computing device 102 obtains input (e.g., adjustment of the roll angel, pitch angle, and/or yaw angle), the opposing views displayed in the user interface are updated accordingly.

In block 340, a vertical reference object is obtained in one of the views of rectilinear images. To facilitate identification of the vertical reference object, the user interface may superimpose a grid onto the opposing views displayed in the user interface. In block 350, a roll angle adjustment, a pitch angle adjustment, and/or a yaw angle adjustment is obtained for aligning the vertical reference object with a vertical axis. In block 360, a view angle adjustment corresponding to reduction of the horizontal misalignment is obtained. In block 370, a panoramic 360-degree video is generated based on each of: the obtained vertical reference object; the obtained roll angle adjustment, pitch angle adjustment, and/or yaw angle adjustment, and the view angle adjustment. Thereafter, the process in FIG. 3 ends.

Figure 4:
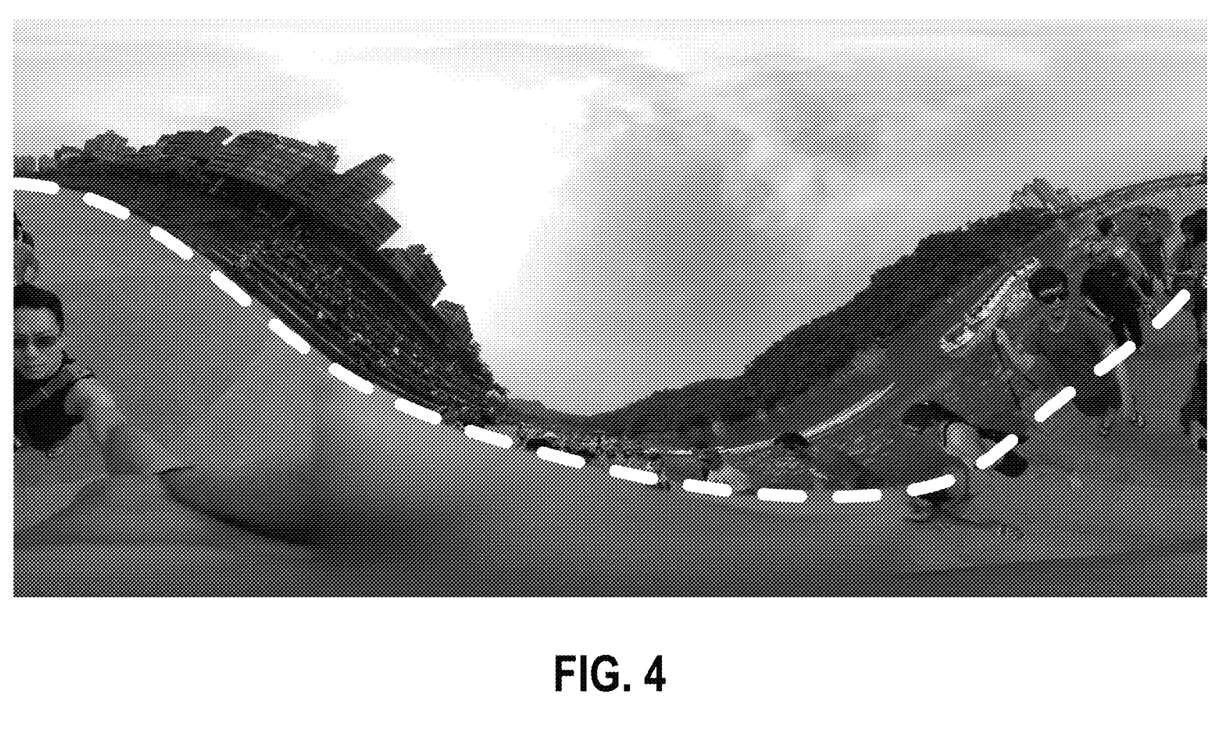
FIG. 4 illustrates an example of a 360-degree video exhibiting horizontal misalignment.
Figure 5:
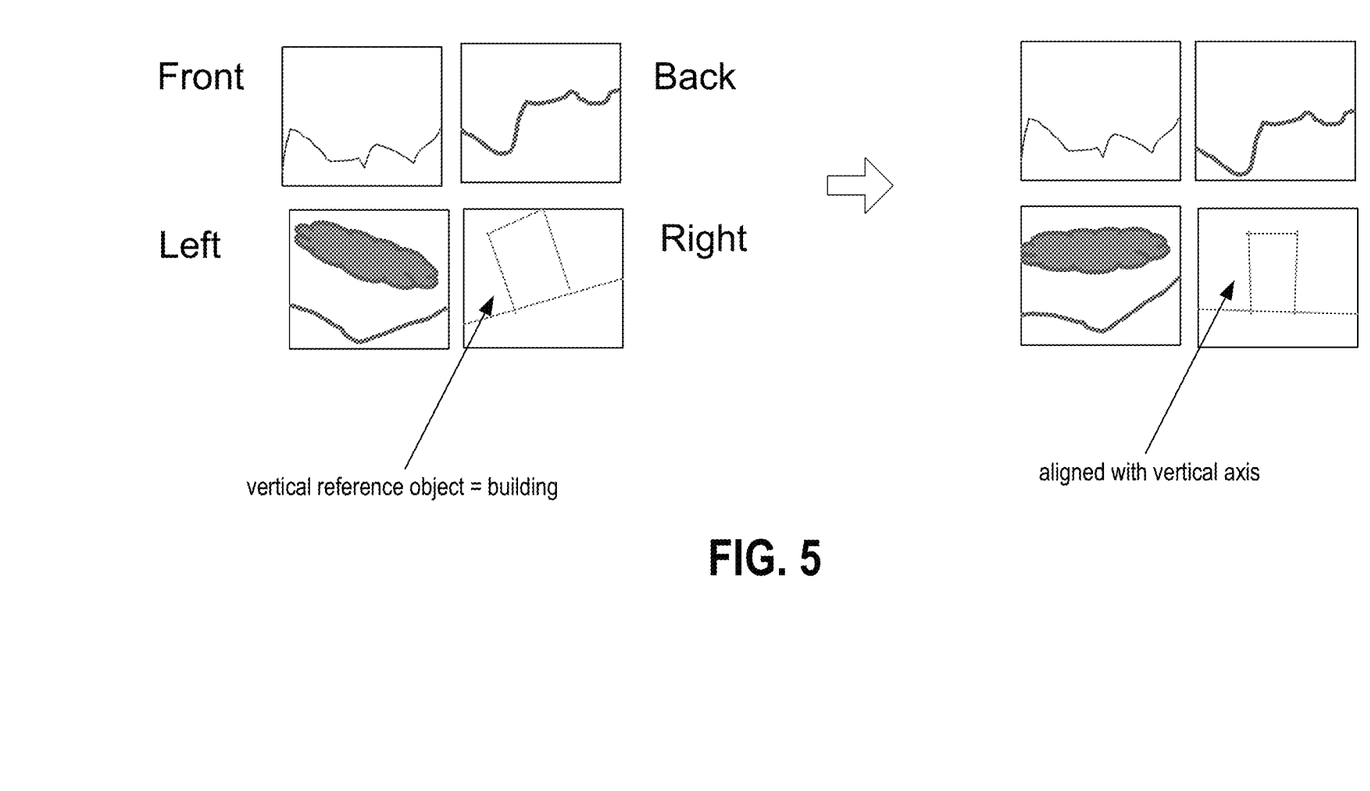
FIG. 5 illustrates alignment of a vertical reference object with the vertical axis in accordance with various embodiments.

Having generally described an exemplary process for reducing horizontal misalignment in a 360-degree video, additional details regarding various steps and concepts in the flowchart of FIG. 3 are now disclosed. First, FIG. 4 illustrates an example of 360-degree video exhibiting horizontal misalignment where the original 360-degree video is tilted. FIG. 5 illustrates alignment of a vertical reference object with the vertical axis in accordance with various embodiments. FIG. 5 shows four views—a front view, back view, left view, and right view. For purposes of this disclosure, the front view is defined as the camera's angle having a roll angle of 0 degrees, a yaw angle of 0 degrees, and a pitch angle of 0 degrees. The back view is defined as the camera's angle having a roll angle of 0 degrees, a yaw angle of 180 degrees, and a pitch angle of 0 degrees.

The rectilinear views comprise at least two views, where the views may comprise, for example, a front and back view and/or a left and right view. Data collection is performed during execution of user actions, where the data comprises at least one of: yaw, roll, and pitch angle of view. For example, the vertical reference object is identified to be a building shown in the right view of FIG. 5. While the user is adjusting the right view according to the vertical side of the building, the adjustment module collects the actions done by the user. The user may move the right view until the side of the building object is aligned with a vertical axis. Suppose that a wall of a building depicted in a view is designated as a vertical reference feature. If the wall of the building is not vertically aligned, the navigation unit 120 adjusts the roll angle until the wall of the building is vertically aligned. As shown in FIG. 5, a wall of the building depicted in the right view is not vertically aligned. The roll angle of the right angle is adjusted until building is in an upright position. Note that the roll angles of the remaining views are not adjusted.

FIG. 6 illustrates reduction of horizontal misalignment in accordance with various embodiments. The left and right views show two misaligned horizontal curves. The user moves the two curves until both are aligned with a horizontal axis. While the user is adjusting both views according to the horizontal axis, the adjustment module collects the actions done by the user.

Figure 7:
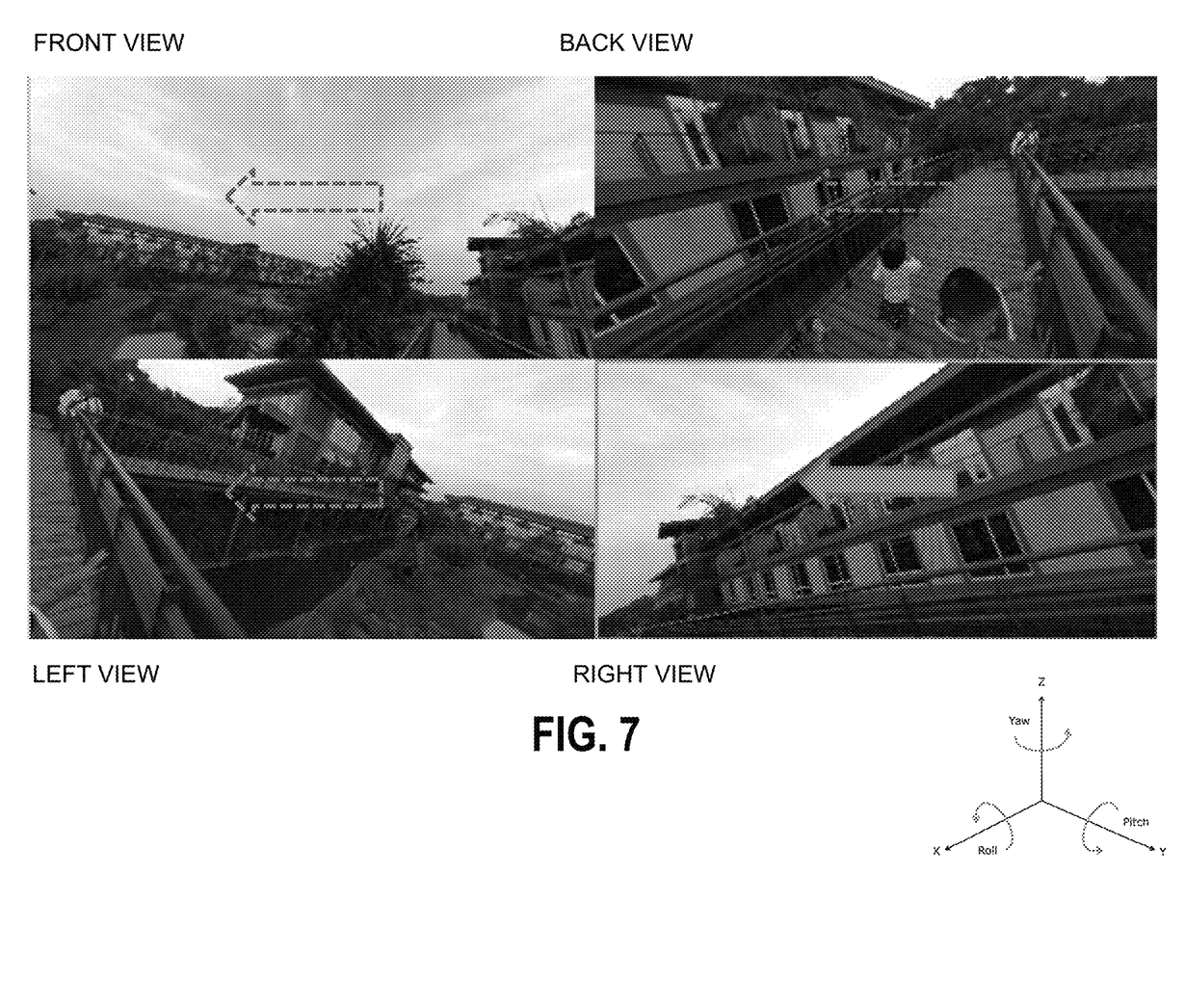
FIG. 7 illustrates adjustment of the yaw angle for the left and right views in order to identify a suitable object candidate in accordance with various embodiments.

FIG. 7 illustrates how adjustment of the yaw angle for the left and right views in order to identify a suitable object candidate in accordance with various embodiments. In this case, the objects in the four views are all tilted. The user may need to adjust the yaw angle of one of the views (the right view) until the object in the view is aligned with a vertical axis. The remaining three views are automatically adjusted according to the adjusted view, for example, the right view. In other words, the same roll/pitch/yaw angle that is adjusted in one view is applied to the other view(s), where adjustment of the roll/pitch/yaw angle of one view triggers automatic adjustment of the remaining view(s). While the user is adjusting a yaw angle until the vertical reference object is aligned with a vertical axis, the adjustment module collects the actions done by the user.

Figure 8:
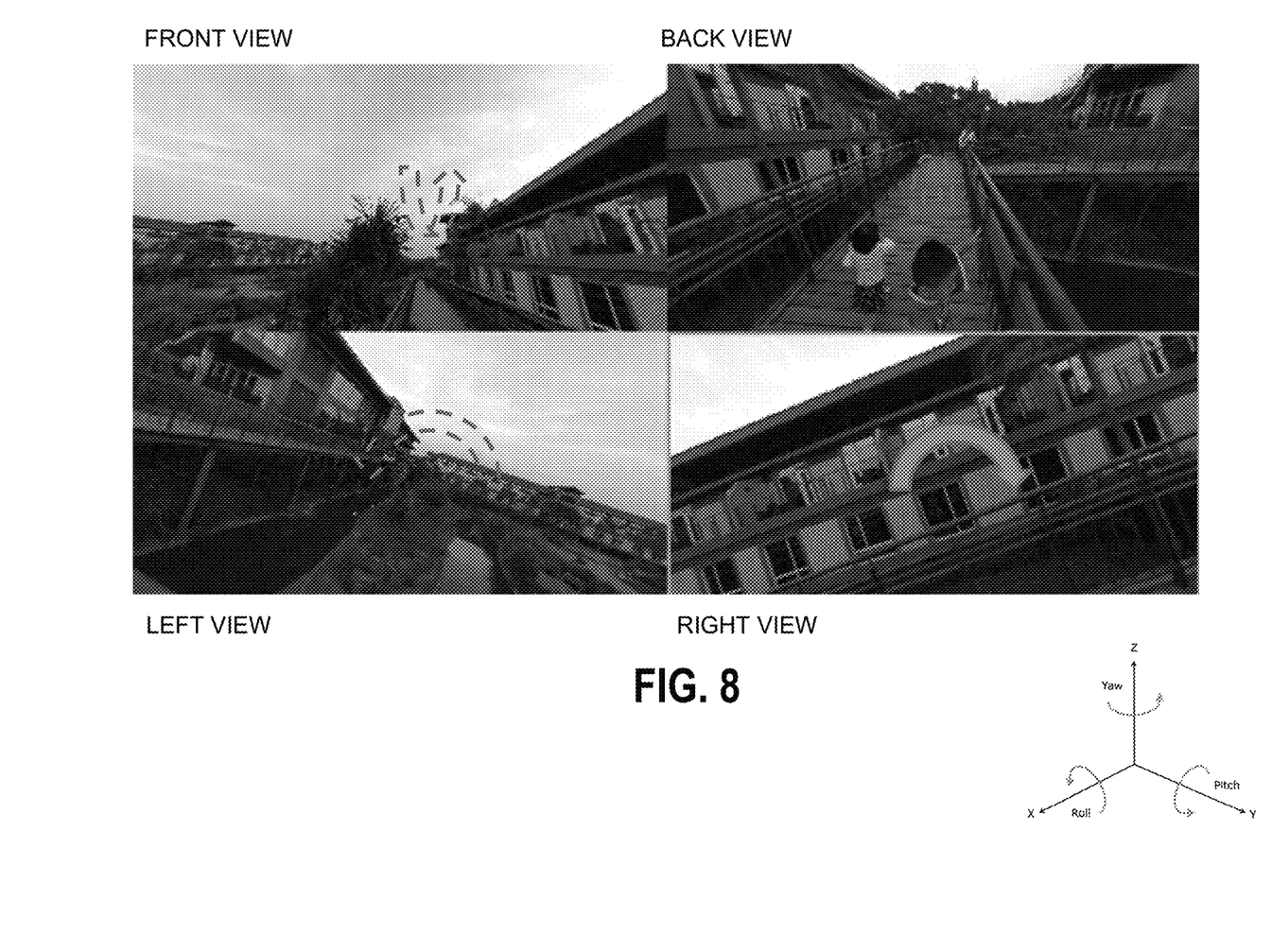
FIG. 8 illustrates an example where a vertical reference has been identified but where the walls of the building are not vertically aligned in accordance with various embodiments.

FIG. 8 illustrates an example where a vertical reference has been identified but where the walls of the building are not vertically aligned in accordance with various embodiments. Following the step shown in FIG. 7, the result is not aligned yet, so the user may further adjust a roll angle in the right view. While the user is adjusting a roll angle until the vertical reference object is aligned with a vertical axis, the adjustment module collects the actions done by the user.

Figure 9:
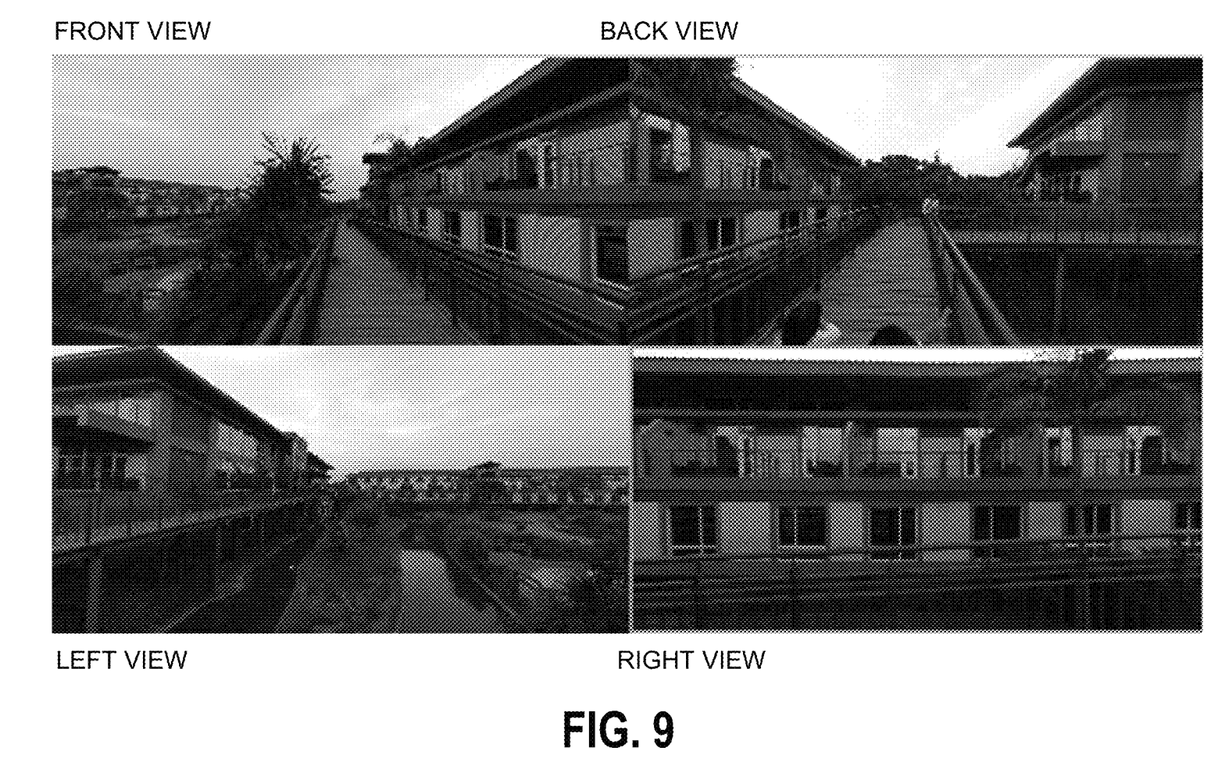
FIG. 9 illustrates various views after adjustment of the vertical reference object where the vertical reference feature is aligned with the vertical axis and where horizontal misalignment has been corrected in accordance with various embodiments.

FIG. 9 illustrates various views after adjustment of the vertical reference object where the vertical reference feature is aligned with the vertical axis and where horizontal misalignment has been corrected in accordance with various embodiments. The four views are finally all aligned with the vertical axis.

Figure 10:
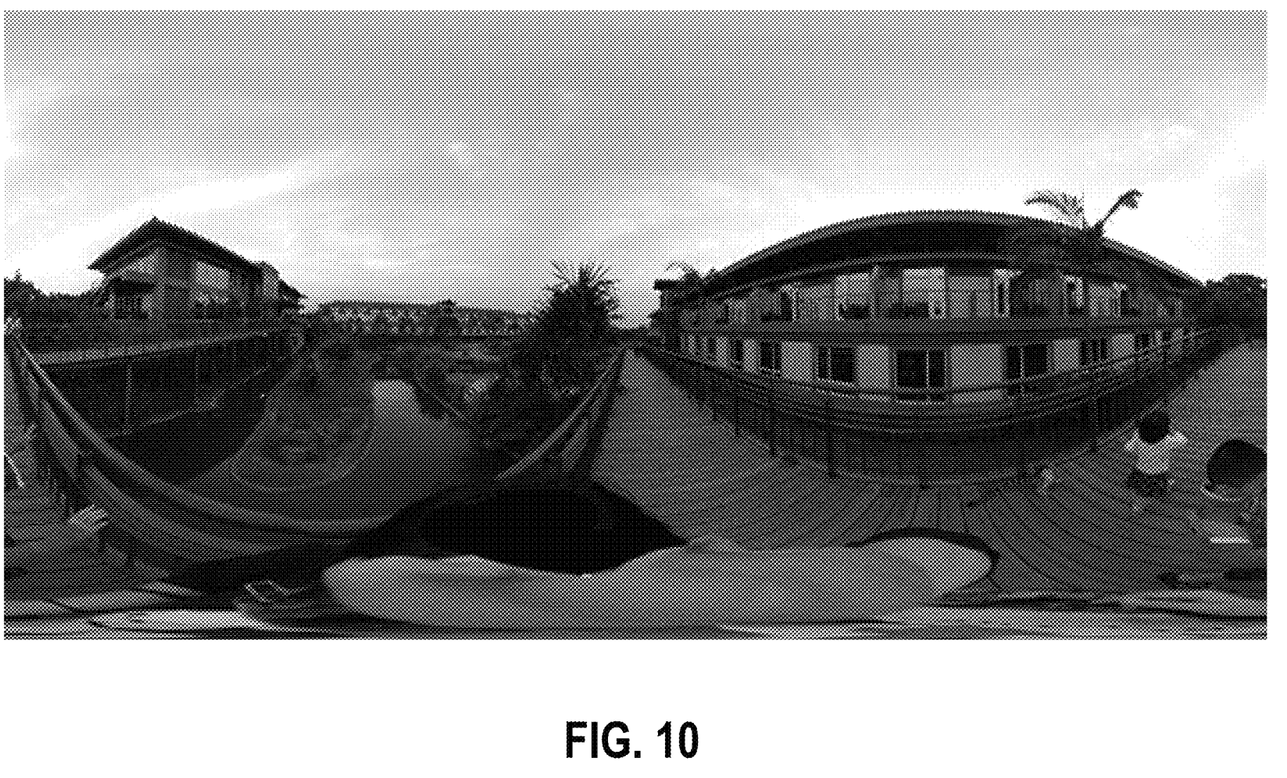
FIG. 10 illustrates the result of FIG. 9 in panorama mode in accordance with various embodiments.

FIG. 10 illustrates the result of FIG. 9 in panorama mode in accordance with various embodiments. After correct horizontal alignment is done, the rectilinear view is then re-constructed to a panorama view according to the data collected in the above steps.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method implemented in a computing device for reducing horizontal misalignment in a 360-degree video, comprising:
   generating a plurality of views from orthogonal rectilinear images in the 360-degree video;
   generating a user interface displaying the plurality of views from the orthogonal rectilinear images in the 360-degree video;
   obtaining a first vertical reference feature in one of the views from the orthogonal rectilinear images, wherein the first vertical reference feature is specified by a user;
   obtaining a first angle based on aligning the first vertical reference feature with a vertical axis of a first view;
   obtaining a second vertical reference feature in a second one of the views from the orthogonal rectilinear images, wherein the second vertical reference feature is specified by the user;

obtaining a second angle based on aligning the second vertical reference feature with a vertical axis of the second view; and generating a panoramic 360-degree video based on the first angle adjustment and the second angle adjustment.

2. The method of claim 1, wherein the generated user interface concurrently displays the plurality of views from the orthogonal rectilinear images in the 360-degree video.

3. The method of claim 2, wherein updating the user interface comprises superimposing a grid on the plurality of views from the orthogonal rectilinear images concurrently displayed in the user interface.

4. A system for reducing horizontal misalignment in a 360-degree video, comprising:

a memory device storing instructions; and a processor coupled to the memory device and configured by the instructions to at least:

generate a plurality of views from orthogonal of rectilinear images in the 360-degree video;

generate a user interface displaying the plurality of views from the orthogonal rectilinear images in the 360-degree video;

obtain a first vertical reference feature in one of the views from the orthogonal rectilinear images, wherein the first vertical reference feature is specified by a user;

obtain a first angle based on aligning the first vertical reference feature with a vertical axis of a first view;

obtain a second vertical reference feature in a second one of the views from the orthogonal rectilinear images, wherein the second vertical reference feature is specified by the user;

obtain a second angle based on aligning the second vertical reference feature with a vertical axis of the second view; and generate a panoramic 360-degree video based on the first angle adjustment and the second angle adjustment.

5. The system of claim 4, wherein the generated user interface concurrently displays the plurality of views from the orthogonal rectilinear images in the 360-degree video.

6. The system of claim 5, wherein the processor is configured to update the user interface by superimposing a grid on the plurality of views from the orthogonal rectilinear images concurrently displayed in the user interface.

7. A non-transitory computer-readable storage medium storing instructions to be implemented by a computing device for reducing horizontal misalignment in a 360-degree video, the computing device having a processor, wherein the instructions, when executed by the processor, cause the computing device to at least:

generate a plurality of views from orthogonal rectilinear images in the 360-degree video;

generate a user interface plurality of views from the orthogonal rectilinear images in the 360-degree video;

obtain a first vertical reference feature in one of the views from the orthogonal rectilinear images, wherein the first vertical reference feature is specified by a user;

obtain a first angle based on aligning the first vertical reference feature with a vertical axis of a first view;

obtain a second vertical reference feature in a second one of the views from the orthogonal rectilinear images, wherein the second vertical reference feature is specified by the user;

obtain a second angle based on aligning the second vertical reference feature with a vertical axis of the second view; and generate a panoramic 360-degree video based on the first angle adjustment and the second angle adjustment.

8. The non-transitory computer-readable storage medium of claim 7, wherein the generated user interface concurrently displays the plurality of views from the orthogonal rectilinear images in the 360-degree video.

9. The non-transitory computer-readable storage medium of claim 8, wherein the processor is configured to update the user interface by superimposing a grid on the plurality of views from the orthogonal rectilinear images concurrently displayed in the user interface.

* * * * *